INVENTOR.
FRITZ KÖTTING
BY James M. Heilman
ATTORNEY.

United States Patent
Kotting

[15] 3,666,259
[45] May 30, 1972

[54] APPARATUS FOR FASTENING A SPECTACLE GLASS MOUNT OR LENS MOUNT ON A WORK OR CLAMPING TABLE

[72] Inventor: Fritz Kotting, Sturzelberg, Germany
[73] Assignee: Firma Wernicke & Co., Dusseldorf-Eller, Germany
[22] Filed: Oct. 9, 1969
[21] Appl. No.: 865,085

[30] Foreign Application Priority Data

Nov. 5, 1968 Germany...................G 68 05 428

[52] U.S. Cl.....................269/90, 24/263 LS, 269/203, 269/304, 287/189.36 F
[51] Int. Cl..........................................B25b 1/02
[58] Field of Search............................269/81–84, 89, 269/90, 104, 105, 110, 141, 148, 149, 203, 258, 259–284, 304, 305, 315; 24/263 LS, 263 LL; 287/189.36 F

[56] References Cited

UNITED STATES PATENTS

| 189,831 | 5/1877 | Zimmerman.................269/203 X |
| 1,619,853 | 3/1927 | Correa...............287/189.36 F UX |
| 2,208,860 | 7/1940 | Smart.........................24/263 LS X |
| 2,563,169 | 8/1951 | Hughes...............................269/305 |
| 3,008,368 | 11/1961 | Hammitt............287/189.36 F UX |
| 3,145,417 | 8/1964 | Shatzel........................269/234 X |
| 18,582 | 11/1857 | Gaylord........................269/315 X |

Primary Examiner—Andrew R. Juhasz
Attorney—James M. Heilman and Heilman & Heilman

[57] ABSTRACT

The invention relates to an apparatus for fastening a glass mount on a work or clamping table of a scanning, grinding, etc. machine, with an adjustable bar or rule bearing against one section of the mount.

4 Claims, 3 Drawing Figures

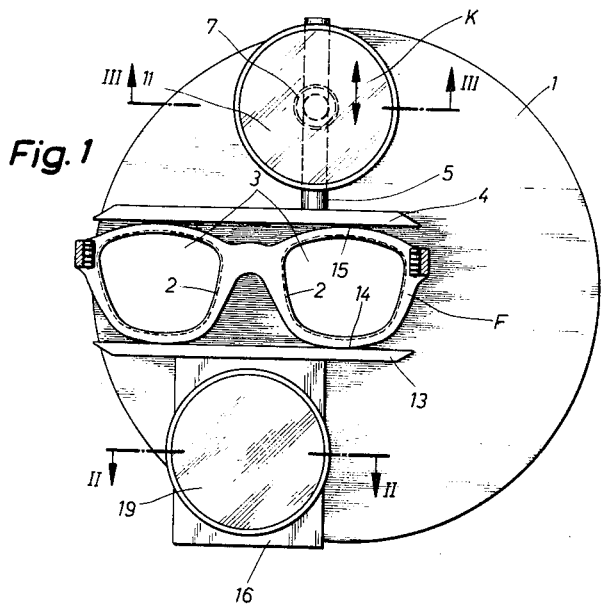

APPARATUS FOR FASTENING A SPECTACLE GLASS MOUNT OR LENS MOUNT ON A WORK OR CLAMPING TABLE

The invention relates to an apparatus for fastening a glass mount on a work or clamping table of a scanning, grinding, etc. machine, with an adjustable bar or rule bearing against one section of the mount. The glass mount as used in this application is only the front part of the frame that comprises the two apertures for receiving and holding the spectacle lenses, and which element is to be clamped in the present case. The sides which hold the mount or front portion on the head of the user and which extend behind the ears form, together with the glass mount, the glass frame or spectacle frame.

For machining glass mounts, or for scanning the inner edge of mount openings it is known to use apparatus for fastening on a work or clamping table. In one embodiment of these apparatuses the adjustable bar or rule is guided in a link and can thus be adjusted in one direction. After the mount has been made to bear on the adjustable bar or rule it is pressed against the top side of the work or clamping table.

The object of the invention is to improve the known apparatuses of the above mentioned type, insuring not only a firm and safe clamping of the glass mount but also that the mount can be clamped easily into the apparatus by unskilled workers. Beyond that the apparatus is simple in design, and is inexpensive.

In order to achieve this objective the invention provides an apparatus of the above mentioned type which is characterized in that the bar or rule carries on its side remote from the mount a plate, etc. which can be moved in all directions with respect to a threaded pin connected with the work or clamping table and locked in the adjusted position, or a rod-shaped extension which can be moved longitudinally on a journal rotating on the table and locked in the adjusted position.

Preferably both types of apparatus for fastening a glass mount will be used in such a way that the apparatus with the rod-shaped extension on the bar or rule is associated with the apparatus with the plate on the adjustable bar. But it is also possible to use each type of apparatus by itself or two identical types of apparatus.

Specifically the universally adjustable plate is provided with a central bore which is substantially greater than the threaded pin traversing it, on which can be screwed a clamping nut overlapping the bore rim on the plate.

The threaded pin of the embodiment with the rod-shaped extension can rotate in a bore of the table, but it is secured against longitudinal displacement, the threaded pin having a central slot for receiving the rod-shaped extension. This slot extends in the longitudinal direction of the threaded pin in such a way that the rod-shaped extension is pressed by the clamping screw, which can be screwed on the threaded pin, against the table top.

To this end the slot, which is open at the top, can protrude downward under the table top. When the clamping screw is tightened, the rod-shaped extension of the bar and the latter itself is pressed against the table top so that rotation of the threaded pin about its central axis is also prevented.

The drawing shows one example each of one and the other embodiment of the parts connected with the bar or the rule.

On the round table plate 1 rests the glass mount F in such a way that the side of the mount remote of the user of the glasses bears on the surface of the table plate.

The mount must be so fixed in this position on the table plate that either the glass mount can be machined or that the inner edge 2 of the openings 3 of the glass mount can be scanned with a feeler.

Figure 1:
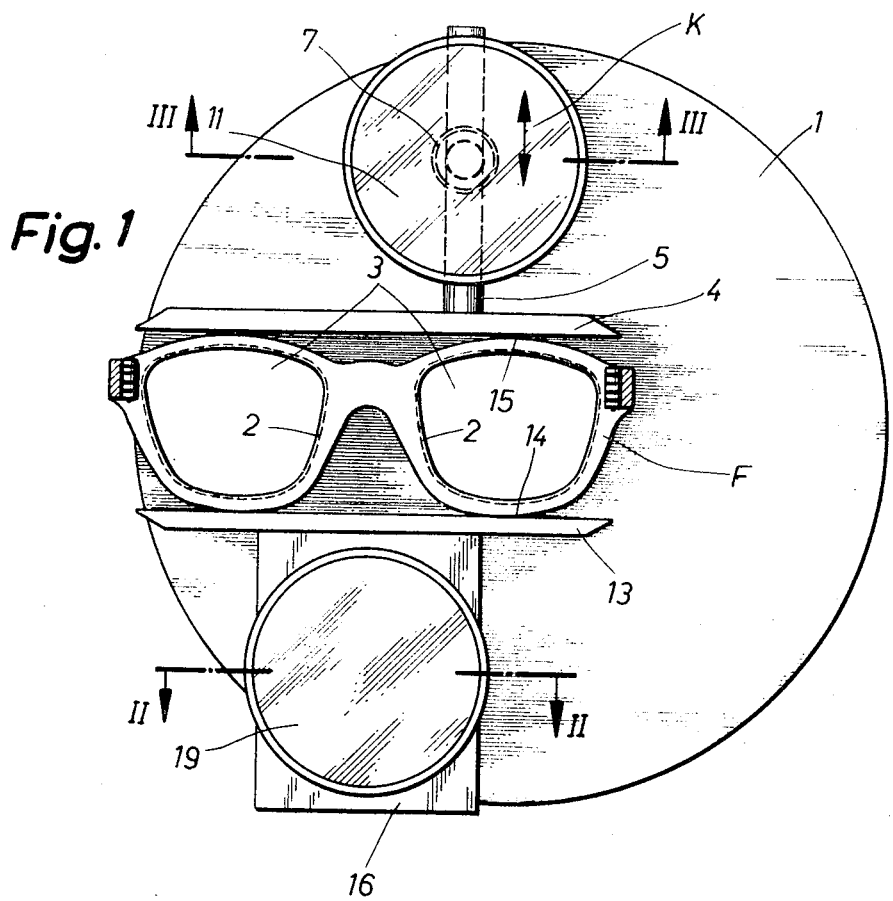
FIG. 1 shows a top view of two bars or rules with one embodiment each of the fastening apparatus.
Figure 2:
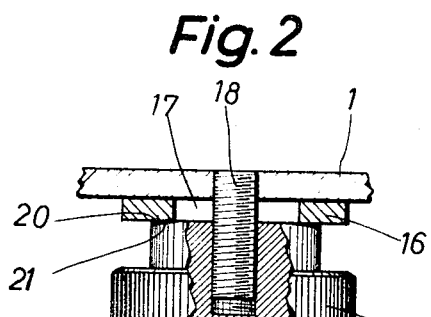
FIG. 2 shows a section along the line II—II.
Figure 3:
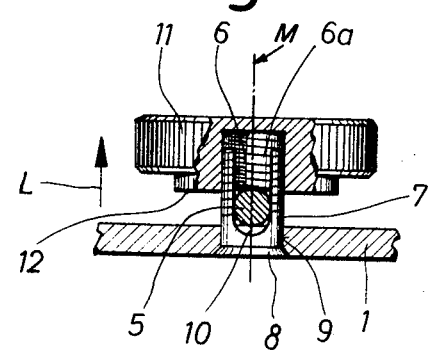
FIG. 3 shows a section along the line III—III of FIG. 1.

To this end is provided a first bar 4, which bears on the surface of the table plate 1 and which has substantially the same length as the glass mount. The bar carries approximately in mid-height a rod-shaped extension 5 which protrudes through a slot 6 of a threaded pin 7 in which the extension 5 is displaceable in longitudinal direction, that is, in the direction of the double arrow K in FIG. 1. The width of the slot 6 corresponds approximately to the diameter of extension 5.

The threaded pin 7 carries a widened or beveled head 8 by means of which the pin is ensured in the corresponding bore 9 of the plate 1 against longitudinal displacement, but can turn about its central axis M. The pin 7 can thus be so turned that the bar 4, taking into account its displacement in the direction of the double arrow K, can assume different positions with respect to its position indicated in FIG. 1.

A clamping nut 11 can be screwed on the thread of the threaded pin 7, whose slot 6 is open at the top at 6a and which protrudes with its bottom end at 10 downward under the surface of the table plate 1, in such a way that the bottom edge 12 of this nut bears against the rod-shaped extension 5 and that this extension or the bar 4 or both parts are clamped against the surface of the table 1 so that the bar 4 is fixed in its position.

When the clamping nut 11 is loosened, the rod-shaped extension 5 can be moved in the direction of the double arrow K, and the bar 4 can turn about the pin 7.

The second bar 13 bears on the section 14 of the glass mount F, which is opposite the section 15. This bar has approximately the length of the mount F. In order to achieve parallelism of both bars 4 and 13, the bar 13 is provided with a plate 16 which bears on the surface of the table plate 1. This plate has a bore 17 which is substantially greater than the diameter of the threaded pin 18, which is held rotatably or non-rotatably in the table plate 1. On the pin 18 is a clamping nut 19 whose edge 20 bears on the edge 21 of the extension of one bar, and the longitudinal center line of the plate of the other bar are laterally staggered while arranged parallel to each other.

I claim:

1. Apparatus for fastening a glass mount on a table plate comprising; a table plate for supporting the glass mount; a first clamping means including a first bar, a rod secured to the bar, a first threaded screw secured to the table plate, said first screw formed with a transverse slot for holding the rod, and a first threaded nut on the first screw for clamping the rod; a second clamping means including a second bar, an adjustable plate formed with a hole and secured to the second bar, a second threaded screw secured to the plate and positioned within the hole, and a second threaded nut on the second screw for clamping the adjustable plate; said first and second bars comprising a set of jaws for securing the glass mount in any desired position on the table plate.

2. Apparatus as claimed in claim 1 wherein the hole in the adjustable plate is at least twice the diameter of the second threaded screw.

3. Apparatus as claimed in claim 1 wherein the transverse slot in the first screw is open at the top and extends downwardly to a point beneath the upper level of the surface of the table plate.

4. Apparatus as claimed in claim 1 wherein said second nut is formed with a base which is larger than the hole in the adjustable plate.

* * * * *